(12) United States Patent
Hara et al.

(10) Patent No.: US 11,715,989 B2
(45) Date of Patent: Aug. 1, 2023

(54) ELECTRONIC CONTROL DEVICE AND ELECTRIC DRIVE DEVICE

(71) Applicant: HITACHI AUTOMOTIVE SYSTEMS, LTD., Hitachinaka (JP)

(72) Inventors: Hideyuki Hara, Hitachinaka (JP); Takuro Kanazawa, Hitachinaka (JP); Kazuhiko Nakano, Hitachinaka (JP); Akira Ishii, Hitachinaka (JP); Tetsuro Tateyama, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 402 days.

(21) Appl. No.: 16/968,639

(22) PCT Filed: Sep. 7, 2018

(86) PCT No.: PCT/JP2018/033147
§ 371 (c)(1),
(2) Date: Aug. 10, 2020

(87) PCT Pub. No.: WO2019/159406
PCT Pub. Date: Aug. 22, 2019

(65) Prior Publication Data
US 2020/0403477 A1    Dec. 24, 2020

(30) Foreign Application Priority Data
Feb. 19, 2018    (JP) .................................. 2018-026843

(51) Int. Cl.
*H02K 5/22*    (2006.01)
*H02K 11/33*    (2016.01)
(Continued)

(52) U.S. Cl.
CPC .............. *H02K 5/225* (2013.01); *H01R 4/027* (2013.01); *H01R 43/02* (2013.01); *H02K 3/522* (2013.01);
(Continued)

(58) Field of Classification Search
CPC .......... H02K 11/33; H02K 3/522; H02K 5/22; H02K 5/225; H02K 2211/03; H02K 11/30;
(Continued)

(56) References Cited

U.S. PATENT DOCUMENTS 5,412,271 A    5/1995  Mizuno
2012/0286603 A1*  11/2012  Suga .................... H02K 11/33
310/71

(Continued)

FOREIGN PATENT DOCUMENTS

JP    H07-016567 U    3/1995
JP    2014-160717 A   9/2014
(Continued)

OTHER PUBLICATIONS

International Search Report issued in corresponding application No. PCT/JP2018/033147 dated Oct. 16, 2018 with English translation.
(Continued)

*Primary Examiner* — Alexander A Singh
(74) *Attorney, Agent, or Firm* — Foley & Lardner LLP

(57) ABSTRACT

An element-side connection terminal (40) extending from a power conversion circuit unit (16) includes a first connection terminal portion (40A) that extends in a direction intersecting a direction of extension of a counterpart-side connection terminal (38); and a second connection terminal portion (40B) that is bent at a point before the first connection terminal portion (40A) reaches the counterpart-side connection terminal (38) in a direction to intersect the direction of
(Continued)

extension of the counterpart-side connection terminal (38) such that the second connection terminal portion (40B) is provided with elasticity and is in an elastic contact with the counterpart-side connection terminal (38) at an angle. A tip end side (38T) of the counterpart-side connection terminal (38) and a tip end side (40T) of the second connection terminal portion (40B) are electrically joined.

10 Claims, 11 Drawing Sheets

(51) Int. Cl.
   *H01R 4/02*   (2006.01)
   *H01R 43/02*  (2006.01)
   *H02K 3/52*   (2006.01)
   *B62D 5/04*   (2006.01)

(52) U.S. Cl.
   CPC ............ *H02K 11/33* (2016.01); *B62D 5/0457* (2013.01); *H02K 2211/03* (2013.01)

(58) Field of Classification Search
   CPC ........ H02K 11/38; H01R 43/02; H01R 4/027; H01R 4/48; B62D 5/0406; B62D 5/0457
   USPC .................................................. 310/71, 68 R
   See application file for complete search history.

(56) References Cited

U.S. PATENT DOCUMENTS

| | | | |
|---|---|---|---|
| 2015/0171709 A1* | 6/2015 | Ito .......................... | H02K 5/225 310/52 |
| 2015/0180316 A1* | 6/2015 | Maeshima ............. | H02K 5/225 310/71 |
| 2016/0036306 A1* | 2/2016 | Yamasaki .............. | H02K 5/225 310/71 |
| 2017/0015347 A1* | 1/2017 | Mori ...................... | B62D 5/046 |
| 2017/0066470 A1* | 3/2017 | Asao ...................... | H02K 5/225 |

FOREIGN PATENT DOCUMENTS

| | | |
|---|---|---|
| JP | 2015-134598 A | 7/2015 |
| JP | 2018-007553 A | 1/2018 |

OTHER PUBLICATIONS

Written Opinion issued in corresponding application No. PCT/JP2018/033147 dated Oct. 16, 2018 with English translation.

\* cited by examiner

ELECTRONIC CONTROL DEVICE AND ELECTRIC DRIVE DEVICE

The present invention relates to an electronic control device and an electric drive device using this.

BACKGROUND ART

In the field of general industrial machinery, a mechanical control element is driven by an electric motor. Recently, it has been started to adopt a so-called electrically mechanically integrated electric drive device in which an electronic control unit formed of a semiconductor element etc. controlling rotation speed and/or rotation torque of an electric motor is integrally mounted in the electric motor.

As an example of the electrically mechanically integrated electric drive device, for instance, an automobile electric power steering device is configured such that turning direction and turning torque of a steering shaft that turns by a driver's operation of a steering wheel are detected, and, based on these detected values, the electric motor is driven so as to rotate in the same direction as the turning direction of the steering shaft, and then a steering assist torque is generated. To control this electric motor, an electronic control unit (ECU) is provided in the power steering device.

As a conventional electric power steering device, for example, one described in JP Patent Application Publication 2015-134598 (Patent Publication 1) is known. Patent Publication 1 describes an electric power steering device configured by an electric motor and an electronic control device. The electric motor is received in a motor housing having a tube portion made of aluminum alloy etc., and the electronic control device is received in an ECU housing that is arranged on an opposite side to an output shaft in the axial direction of the motor housing.

The electronic control device to be received in the inside of the ECU housing is equipped with a power supply circuit unit, a power module that has a power switching element such as MOSFET to drive and control the electric motor, and a control circuit unit that controls the power switching element. An output terminal of the power module and an input terminal of the electric motor are electrically connected by welding their respective terminal tip ends by TIG welding in general.

By the way, the connection between the output terminal of the power module and the input terminal of the electric motor is conducted by using connection terminals configured as in, for example, JP Patent Application Publication 2014-160717 (Patent Publication 2). As shown in FIG. 14, a power module 61 surrounded by synthetic resin is mounted on a board 60, a U-shaped bent portion 63 is formed on a connection terminal 62 of this power module 61 to provide an elastic function, and a tip-end-side terminal 64 extends along the bending direction from this bent portion 63 as a boundary.

On the other hand, a counterpart-side connection terminal (e.g., input terminal on the electric motor side) 65 is supported by a guide 66, and the counterpart-side connection terminal 65 extends in the same direction as the extension direction of the tip-end-side terminal 64. Furthermore, a tip end portion 64T of the tip-end-side terminal 64 of the power module 61 and a terminal end portion 65T of the counterpart-side connection terminal 65 are overlaid with each other, followed by welding by TIG welding.

Besides, as electric drive devices in which electronic control devices are integrated, there are known electric brakes and electric hydraulic control devices for various hydraulic controls.

PRIOR ART PUBLICATIONS

Patent Publications

Patent Publication 1: JP Patent Application Publication 2015-134598

Patent Publication 2: JP Patent Application Publication 2014-160717

SUMMARY OF THE INVENTION

Task to be Solved by the Invention

By the way, in the case of a connection structure described in Patent Publication 2 as shown in FIG. 14, when the installation position of the counterpart-side connection terminal 65 or the connection terminal 62 of the power module 61 varies such that the counterpart-side connection terminal 65 is displaced in X direction, the counterpart-side connection terminal 65 turns into contact with the bent portion 63 of the connection terminal 62. Therefore, the tip end portion 65T of the counterpart-side connection terminal 65 and the tip end portion 64T of the tip-end-side terminal 64 of the power module 61 are separated to generate a void space. This condition makes it difficult to join them by TIG welding.

To prevent this, in the case of TIG welding, there is taken a method to conduct TIG welding by forcibly clamping the counterpart-side connection terminal 65 and the tip-end-side terminal 64 of the power module 61 from the outside by using a clamping jig to make a contact. In such method, however, the clamping jig, control of the clamping jig, etc. become necessary, thereby causing a task that the unit production cost soars. Furthermore, although it is secondary, there also occurs a task that a load to be inputted by the clamping jig through the connection terminal 62 of the power module 61 becomes excessive to cause a risk of breakage of the power module 61.

It is an object of the present invention to provide an electronic control device in which tip end portions of both connection terminals can be closely contacted and joined without clamping them by a clamping jig, etc., and an electric drive device using this.

Mean for Solving the Task

The present invention is characterized in that an element-side connection terminal extending from a power module comprises a first connection terminal portion that extends in a direction intersecting the direction of extension of a counterpart-side connection terminal, and a second connection terminal portion that is bent at a point before the first connection terminal portion reaches the counterpart-side connection terminal in a direction to obliquely intersect the direction of extension of the counterpart-side connection terminal such that the second connection terminal portion is provided with elasticity and is in an elastic contact with the counterpart-side connection terminal at a predetermined angle, and that a tip end side of the counterpart-side connection terminal and a tip end side of the second connection terminal portion are electrically joined.

Advantageous Effect of the Invention

According to the present invention, the element-side connection terminal extending from the power module is equipped with the second connection terminal portion that is brought into an elastic contact with the counterpart-side connection terminal at a predetermined angle. Therefore, it is possible to join the tip end side of the counterpart-side connection terminal and the tip end side of the second connection terminal portion without using a clamping jig, etc.

MODE FOR IMPLEMENTING THE INVENTION

In the following, an embodiment of the present invention is explained in detail with reference to the drawings. The present invention is not limited to the following embodiment, but includes various modified examples and applied examples belonging to the technical scope of the present invention.

Figure 1:
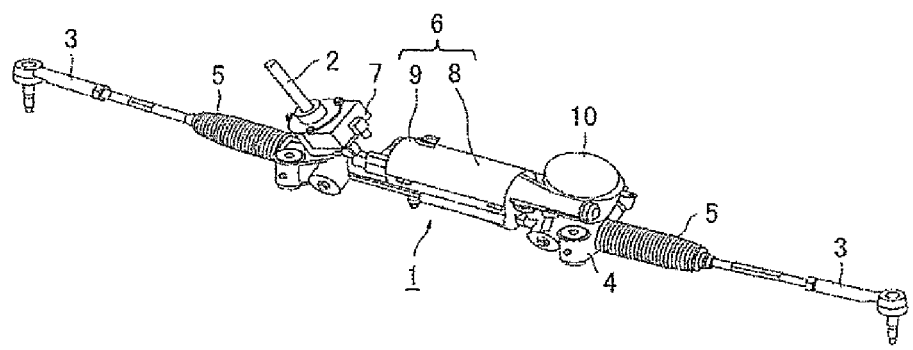
FIG. 1 is a general perspective view of a steering device as one example to which the present invention is applied.

Before explaining the embodiment of the present invention, a configuration of a steering device as an example to which the present invention is applied will be briefly explained by using FIG. 1.

First, a steering device to steer front wheels of a vehicle will be explained. A steering device 1 is configured as shown in FIG. 1. A pinion (not shown in the drawings) is provided at a lower end of a steering shaft 2 connecting to a steering wheel (not shown in the drawings). This pinion is meshed with a rack (not shown in the drawings) that extends in right and left directions of a vehicle body. Tie rods 3 to steer the front wheels in the right and left directions are connected to both ends of the rack. The rack is covered with a rack housing 4. Between the rack housing 4 and each tie rod 3, a rubber boot 5 is provided.

There is provided an electric power steering device 6 to assist torque when performing a turning operation of the steering wheel. That is, there is provided a torque sensor 7 that detects the turning direction and the turning torque of the steering shaft 2. Furthermore, there is provided an electric motor unit 8 that provides a steering assistive force to the rack via a gear 10 on the basis of the detected value of the torque sensor 7. Furthermore, there is provided an electronic control unit (ECU) 9 that controls an electric motor disposed in the electric motor unit 8. The electric motor unit 8 of the electric power steering device 6 is connected to the gear 10 at three portions of an outer periphery on an output shaft side with screws (not shown in the drawings). The electronic control unit 9 is disposed on an opposite side to the output shaft side of the electric motor unit 8.

In the electric power steering device 6, when the steering shaft 2 is turned in either direction by the steering wheel operation, the torque sensor 7 detects the turning direction and the turning torque of the steering shaft 2. A control circuit unit calculates the drive operation amount of the electric motor on the basis of these detected values. The electric motor is then driven by a power switching element of a power conversion circuit unit on the basis of the calculated drive operation amount, and an output shaft of the electric motor rotates so as to drive and rotate the steering shaft 2 in the same direction as the direction of the steering wheel operation. This rotation of the output shaft of the electric motor is transmitted to the rack (not shown in the drawings) through the pinion (not shown in the drawings) and the gear 10, and the vehicle is steered. Since such configuration and workings are well known, a further explanation is omitted.

Next, a configuration of the electric power steering device according to the embodiment of the present invention is explained in detail with reference to FIGS. 2 to 13.

Figure 2:
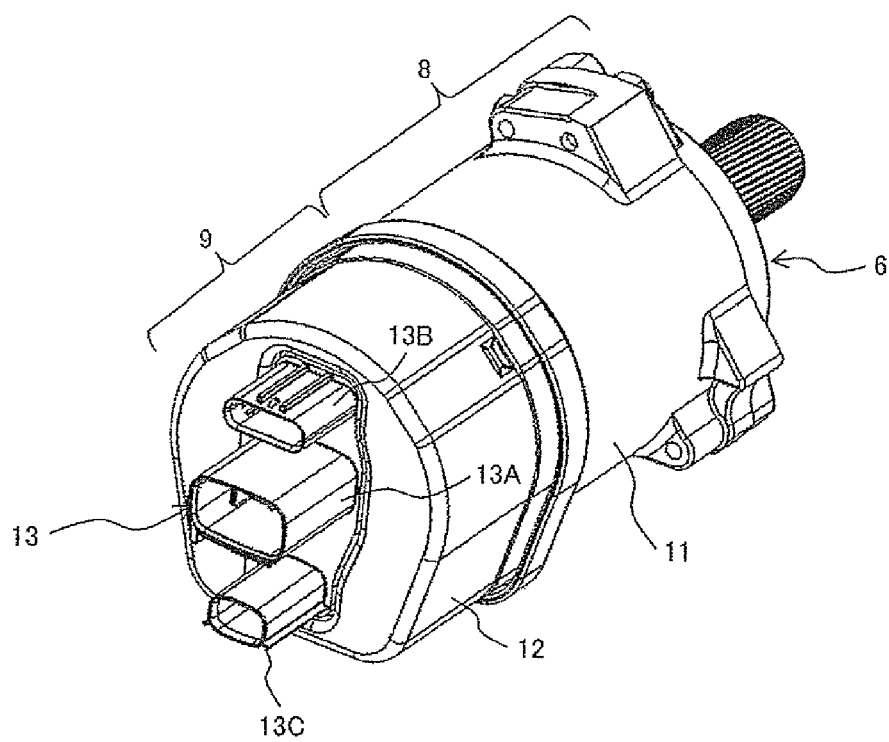
FIG. 2 is a perspective view showing an entire shape of an electric power steering device according to an embodiment of the present invention.
Figure 3:
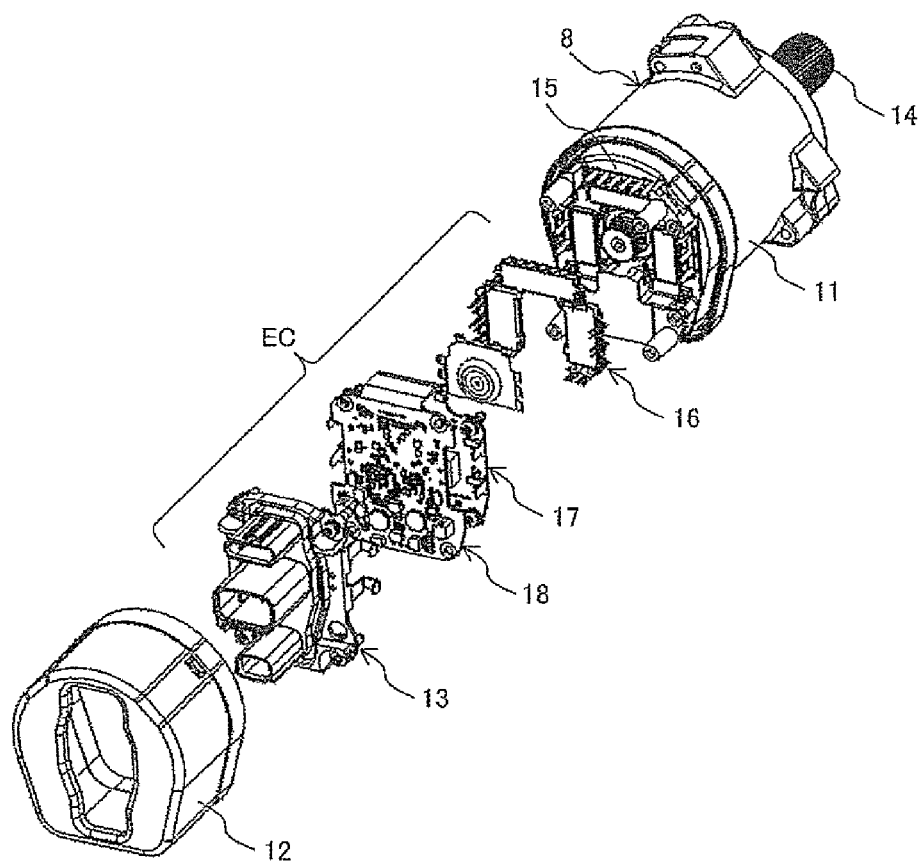
FIG. 3 is a perspective exploded view of the electric power steering device shown in FIG. 2.

FIG. 2 is a view showing an entire configuration of an electric power steering device according to an embodiment of the present invention. FIG. 3 is a view from an oblique direction after exploding constituent parts of the electric power steering device shown in FIG. 2. FIGS. 4 to 9 are views each showing a condition in which each of the constituent parts has been mounted in the order of assembly of the constituent parts. Therefore, the following explanation is conducted by suitably citing each drawing.

As shown in FIG. 2, an electric motor unit 8 forming the electric power steering device is configured by a motor housing 11 having a tube portion made of aluminum or an aluminum-based metal such as aluminum alloy and an electric motor (not shown in the drawings) accommodated in the motor housing 11. An electronic control unit 9 is configured by a metal cover 12 made of aluminum, an aluminum-based metal such as aluminum alloy or an iron-based metal and located on an opposite side to an output shaft of the electric motor in an axial direction of the motor housing 11, and an electronic control assembly (not shown in the drawings) accommodated in this metal cover 12.

The motor housing 11 and the metal cover 12 are integrally fixed at a fixing region that is formed at their opposing end surfaces in an outer circumferential direction by staking. The electronic control assembly accommodated inside the metal cover 12 is configured by a power supply circuit unit that generates a required power, a power module (hereinafter referred to as power conversion circuit unit) having a power switching element such as MOSFET or IGBT that drives and controls the electric motor of the electric motor unit 8, and a control circuit unit that controls the power switching element. An output terminal of the power switching element and a motor winding wire input terminal of the electric motor are electrically connected.

A resin-made connector assembly 13 is exposed from a hole portion formed at an end surface, which is located on an opposite side to the motor housing 11, of the metal cover 12. The resin-made connector assembly 13 is fixed to fixing portions formed at the motor housing 11 with fixing screws. The resin-made connector assembly 13 has a connector terminal forming portion 13A for power supply, a connector terminal forming portion 13B for detection sensors, and a connector terminal forming portion 13C for control state output by which a control state is outputted to an external device.

The electronic control assembly accommodated in the metal cover 12 is supplied with power from a power supply through the synthetic-resin-made connector terminal forming portion 13A for power supply. Furthermore, the electronic control assembly is provided with detection signals of an operating condition, etc. from the detection sensors through the connector terminal forming portion 13B for detection sensors. A current control state signal of the electric power steering device is outputted from the electronic control assembly through the connector terminal forming portion 13C for control state output.

FIG. 3 is a perspective exploded view of the electric power steering device 6. An iron-made annular side yoke (not shown in the drawings) is fitted to an inside of a motor housing 11. The electric motor (not shown in the drawings) is accommodated inside this side yoke. An output portion 14 of the electric motor provides the steering assistive force to the rack via the gear. Since a specific structure of the electric motor is well known, its explanation is omitted here.

The motor housing 11 is made of an aluminum alloy, and acts as a heat sink that radiates or releases heat generated at the electric motor and heat generated in the after-mentioned power supply circuit unit and power conversion circuit unit to the outside atmosphere. The electric motor and the motor housing 11 form the electric motor unit 8.

An electronic control unit EC is connected to an end surface portion 15 of the motor housing 11 which is on an opposite side to the output portion 14 of the electric motor unit 8. The electronic control unit EC has the power conversion circuit unit 16, the power supply circuit unit 17, the control circuit unit 18, and the resin-made connector assembly 13. The end surface portion 15 of the motor housing 11 is formed integrally with the motor housing 11. However, the end surface portion 15 could be formed separately from the motor housing 11, and then fixed to the motor housing 11 with screws or by welding.

Here, the power conversion circuit unit 16, the power supply circuit unit 17 and the control circuit unit 18 form a redundant system by a main electronic control unit and a sub-electronic control unit. In a normal condition, the electric motor is driven and controlled by the main electronic control unit. However, if an abnormal condition or a failure occurs at the main electronic control unit, the control is switched to the sub-electronic control unit, and the electric motor is driven and controlled by the sub-electronic control unit.

Therefore, as mentioned hereinafter, normally, heat from the main electronic control unit is transmitted to the motor housing 11. If the abnormal condition or the failure occurs at the main electronic control unit, the main electronic control unit stops and the sub-electronic control unit operates, then heat from the sub-electronic control unit is transmitted to the motor housing 11.

Furthermore, both of the main electronic control unit and the sub-electronic control unit could operate as a regular electronic control unit. If the abnormal condition or the failure occurs at one of the electronic control units, the other electronic control unit drives and controls the electric motor by half ability. In this case, although capability of the electric motor is half, so-called power steering function is secured. Therefore, in the normal condition, heat from the main electronic control unit and the sub-electronic control unit is transmitted to the motor housing 11.

The electronic control unit EC is configured by the power conversion circuit unit 16, the power supply circuit unit 17, the control circuit unit 18 and the resin-made connector assembly 13. These power conversion circuit unit 16, power supply circuit unit 17, control circuit unit 18 and resin-made connector assembly 13 are arranged so as to be stacked in this order from the side of the end surface portion 15 to a direction moving away from the end surface portion 15. The control circuit unit 18 is a unit that generates a control signal for driving the switching element of the power conversion circuit unit 16, and is configured by a microcomputer and a peripheral circuit and so on. The power supply circuit unit 17 is a unit that generates power to drive the control circuit unit 18 and power for the power conversion circuit unit 16, and is configured by a capacitor, a coil and a switching element and so on. The power conversion circuit unit 16 is a unit that controls power flowing in the motor winding wire of the electric motor, and is configured by a switching element that forms three-phase upper and lower arms and so on.

A unit having a large heat value in the electronic control unit EC is mainly the power conversion circuit unit 16 and the power supply circuit unit 17. Heat of the power conversion circuit unit 16 and the power supply circuit unit 17 is released from the motor housing 11 made of an aluminum alloy. This detailed configuration is described with reference to FIGS. 4 to 9 later.

The resin-made connector assembly 13 made of a synthetic resin is arranged between the control circuit unit 18 and the metal cover 12, and is connected to a vehicle battery (power supply) and other external control devices (not shown in the drawings). Needless to say, this resin-made connector assembly 13 is connected to the power conversion circuit unit 16, the power supply circuit unit 17 and the control circuit unit 18.

The metal cover 12 has a function of accommodating and liquid-tightly sealing the power conversion circuit unit 16, the power supply circuit unit 17 and the control circuit unit 18. In the present embodiment, the metal cover 12 is fixed to the motor housing 11 by staking.

Figure 4:
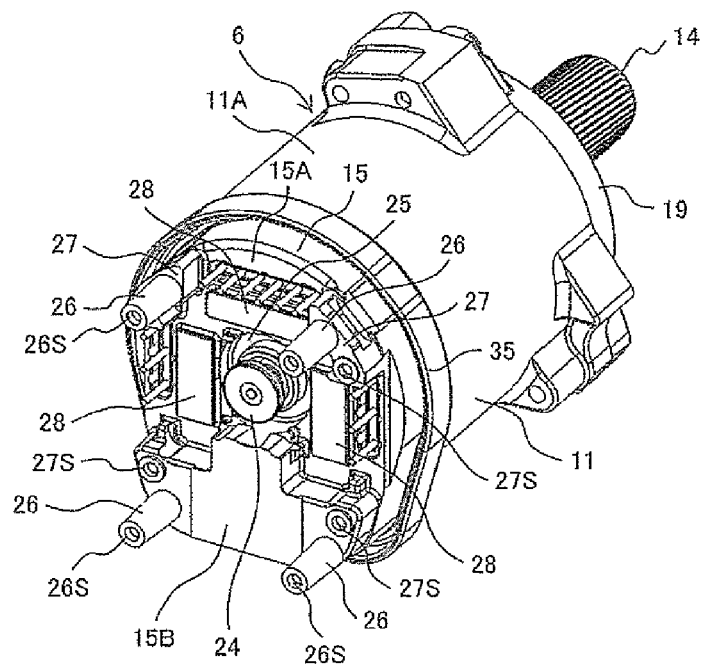
FIG. 4 is a perspective view of a motor housing shown in FIG. 3.
Figure 5:
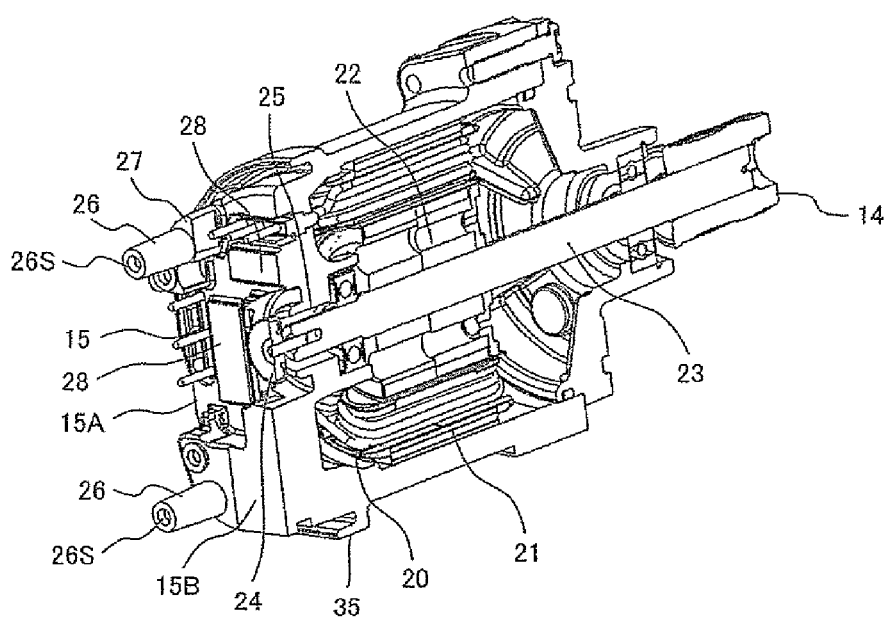
FIG. 5 is a sectional view of the motor housing shown in FIG. 4, which is sectioned in an axial direction.

Next, configuration of each component and an assembling method of the components is explained with reference to FIGS. 4 to 9. FIG. 4 is an external view of the motor housing 11. FIG. 5 is a cross section of the motor housing 11, which is sectioned in an axial direction of the same.

In FIGS. 4 and 5, the motor housing 11 is shaped into a tubular shape. The motor housing 11 has a side peripheral surface portion 11A, the end surface portion 15 that closes one end of the side peripheral surface portion 11A and an end surface portion 19 that closes the other end of the side peripheral surface portion 11A. In the present embodiment, the motor housing 11 has a bottomed cylindrical shape, and the side peripheral surface portion 11A and the end surface portion 15 are formed integrally with each other. The end surface portion 19 serves as a lid, and closes the other end of the side peripheral surface portion 11A after accommodating the electric motor in the side peripheral surface portion 11A.

Figure 9:
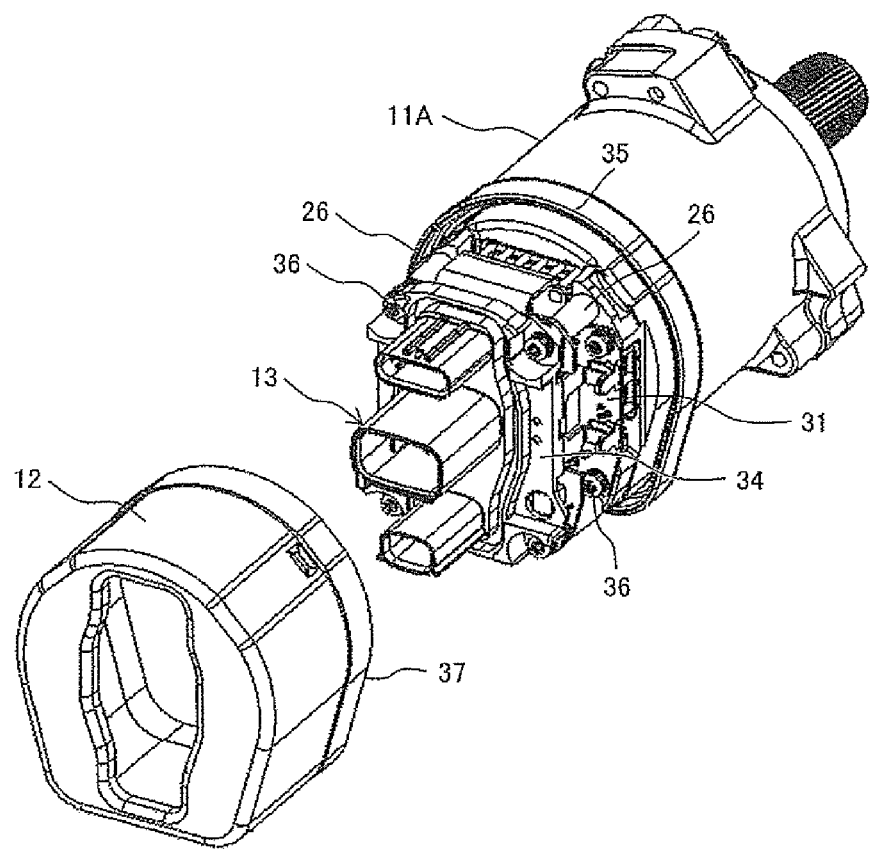
FIG. 9 is a perspective view showing a condition in which a resin-made connector assembly is mounted and fixed to the motor housing shown in FIG. 8.

A motor-housing-side annular groove portion 35 whose diameter is enlarged outwards in a radial direction is formed on an entire circumferential surface of the end surface portion 15. Then, an opening end 37 of the metal cover 12 shown in FIG. 9 is received in this motor-housing-side annular groove portion 35. The motor-housing-side annular groove portion 35 and the opening end 37 of the metal cover 12 (see FIG. 9) are liquid-tightly connected together with a so-called liquid sealant.

As shown in FIG. 5, a stator 21 having cores around which coils 20 are wound is fitted in the side peripheral surface portion 11A of the motor housing 11, and a rotor 22 in which a permanent magnet is embedded is rotatably accommodated inside this stator 21. A rotation shaft 23 is fixed to the rotor 22, and its one end is the output shaft 14, and the other end is a rotation detection portion 24 for detecting a rotation phase and a rotation speed of the rotation shaft 23. The rotation detection portion 24 is provided with a permanent magnet, and protrudes to the outside through a through hole 25 formed at the end surface portion 15. The rotation phase and the rotation speed of the rotation shaft 23 are detected by a magnetism detecting portion configured by a GMR element (not shown in the drawings) etc.

Returning to FIG. 4, heat releasing sections 15A, 15B for the power conversion circuit unit 16 (see FIG. 3) and the power supply circuit unit 17 (see FIG. 3) are formed on a surface of the end surface portion 15 located on an opposite side to the output portion 14 of the rotation shaft 23. Board-connector fixing protrusions 26 are formed integrally with the end surface portion 15 at four corners of the end surface portion 15 so as to stand thereon. A screw hole 26S is formed in the inside.

The board-connector fixing protrusion 26 is provided to secure the after-mentioned circuit board of the control circuit unit 18 and the resin-made connector assembly 13. The board-connector fixing protrusion 26 protruding from the after-mentioned heat releasing section for power conversion 15A has a board receiving portion 27 whose height in the axial direction is the same as that of the after-mentioned heat releasing section for power supply 15B. Each board receiving portion 27 has a screw hole 27S. This board receiving portion 27 is a portion that the after-mentioned glass epoxy board 31 of the power supply circuit unit 17 is mounted on and fixed to.

A flat surface area in the radial direction orthogonal to the rotation shaft 23, which forms the end surface portion 15, is separated into two sections. One is the heat releasing section for power conversion 15A to which the power conversion circuit unit 16 having the power switching element such as the MOSFET is fixed, and the other is the heat releasing section for power supply 15B to which the power supply circuit unit 17 is fixed. In the present embodiment, the area of the heat releasing section for power conversion 15A is greater than that of the heat releasing section for power supply 15B. This is because the redundant system is employed as described above and a mounting area of the power conversion circuit 16 is secured.

A height difference in the axial direction (a direction in which the rotation shaft 23 extends) is provided between two steps of the heat releasing section for power conversion 15A and the heat releasing section for power supply 15B. That is, the heat releasing section for power supply 15B is formed so as to have a step that is away from the heat releasing section for power conversion 16A in the direction of the rotation shaft 23 of the electric motor. This height difference is set to such a distance that the power conversion circuit unit 16 and the power supply circuit unit 17 do not interfere with each other, when the power supply circuit unit 17 is mounted after the power conversion circuit unit 16 is mounted.

The heat releasing section for power conversion 15A is provided with three long narrow rectangular protruding heat-releasing portions 28. These protruding heat-releasing portions 28 are portions on which the power conversion circuit unit 16 for the redundant system is mounted. The protruding heat-releasing portions 28 protrude from the surface of the heat releasing section for power conversion 15A in the direction of the rotation shaft 23 of the electric motor so as to be away from the electric motor.

The heat releasing section for power supply 15B is formed into a flat surface, and the power supply circuit unit 17 is mounted on the heat releasing section for power supply 15B. Therefore, the protruding heat releasing portion 28 acts as a heat releasing portion that releases and transmits heat generated at the power conversion circuit unit 16 to the end surface portion 15, and the heat releasing section for power supply 15B acts as a heat releasing portion that releases and transmits heat generated at the power supply circuit unit 17 to the end surface portion 15.

The protruding heat releasing portions 28 might be removed. In this case, the heat releasing section for power conversion 15A acts as the heat releasing portion that releases and transmits heat generated at the power conversion circuit unit 16 to the end surface portion 15. In the present embodiment, a metal board of the power conversion circuit unit 16 is welded to the protruding heat releasing portions 28 by frictional stir welding, which securely fixes the metal board to the protruding heat releasing portions 28.

As described above, in the present embodiment, a heat sink member is not needed at the end surface portion 15 of the motor housing 11, and the length in the axial direction can be shortened. Furthermore, since the motor housing 11 has a sufficient heat capacity, it is possible to efficiently release heat of the power supply circuit unit 17 and the power conversion circuit unit 16 to the outside from the motor housing 11.

Figure 6:
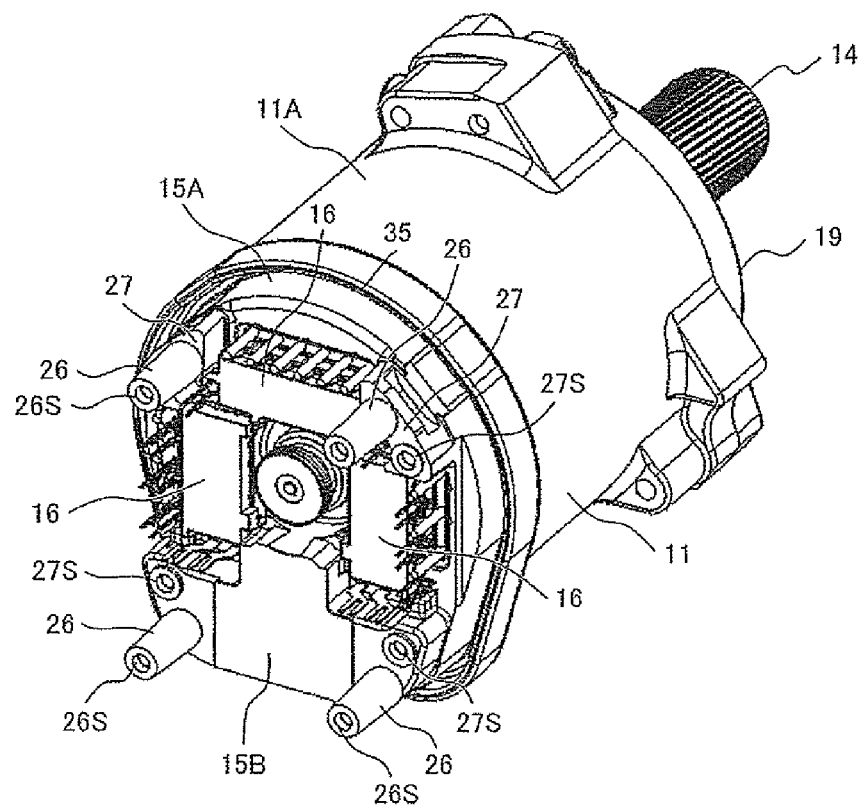
FIG. 6 is a perspective view showing a condition in which a power conversion circuit unit is mounted on and fixed to the motor housing shown in FIG. 4.

Next, FIG. 6 shows a state in which the power conversion circuit unit 16 is mounted on the protruding heat releasing portions 28 (see FIG. 4). As shown in FIG. 6, the power conversion circuit unit 16 forming the redundant system is mounted on the protruding heat releasing portions 28 (see FIG. 4) formed on the heat releasing section for power conversion 15A. The switching element forming the power conversion circuit unit 16 is mounted on the metal board (using an aluminum-based metal), which is a good heat radiation configuration. The metal board is welded to the protruding heat releasing portions 28 by frictional stir welding.

Thus, the metal board of the power conversion circuit unit 16 is firmly fixed to the protruding heat releasing portions 28 (see FIG. 4), and heat generated at the switching element can be efficiently transmitted to the protruding heat releasing portions 28. Heat transmitted to the protruding heat releasing portions 28 diffuses through the heat releasing section for power conversion 15A, and is further transmitted to the side peripheral surface portion 11A of the motor housing 11, and then is released to the outside. Here, as mentioned above, since the height of the heat releasing section for power conversion 15A in the axial direction is lower than that of the heat releasing section for power supply 15B, the power conversion circuit unit 16 does not interfere with the power supply circuit unit 17.

As described above, the power conversion circuit unit 16 is mounted on the protruding heat releasing portions 28 formed on the heat releasing section for power conversion 15A. Therefore, heat generated at the switching element of the power conversion circuit unit 16 can be efficiently transmitted to the protruding heat releasing portions 28. Heat transmitted to the protruding heat releasing portions 28 diffuses through the heat releasing section for power conversion 15A, and is further transmitted to the side peripheral surface portion 11A of the motor housing 11, and then is released to the outside.

Figure 7:
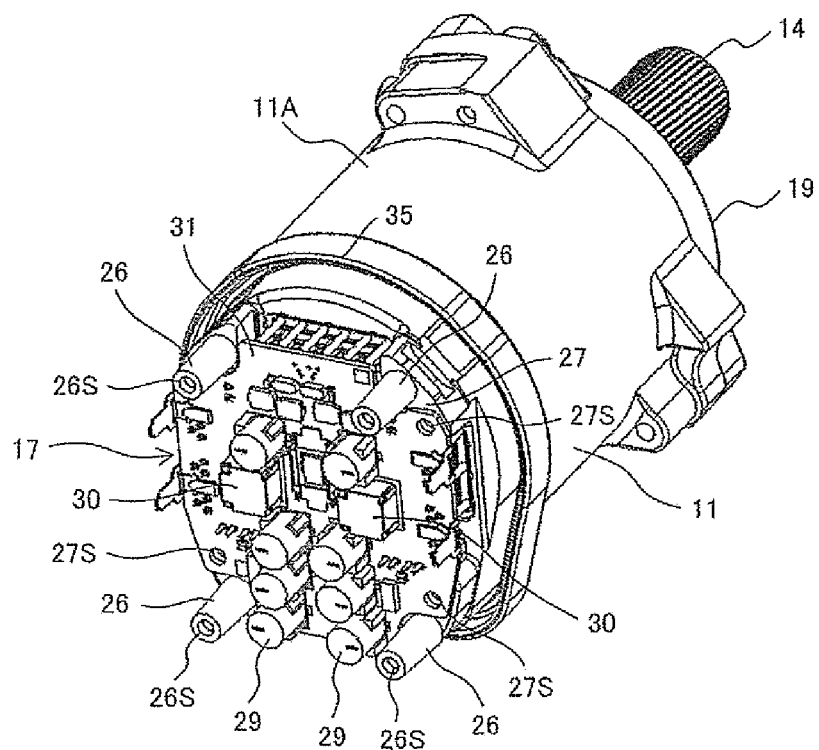
FIG. 7 is a perspective view showing a condition in which a power supply circuit unit is mounted on and fixed to the motor housing shown in FIG. 6.

Next, FIG. 7 shows a state in which the power supply circuit unit 17 is mounted above the power conversion circuit unit 16. As shown in FIG. 7, the power supply circuit unit 17 is mounted on the heat releasing section for power supply 15B. Capacitors 29 and coils 30 and so on which form the power supply circuit unit 17 are mounted on the glass epoxy circuit board 31. The power supply circuit unit 17 has the redundant system, and, as can be seen from the drawings, power supply circuits configured by the capacitors 29 and the coils 30 etc., which are arranged symmetrically with respect to each other, are provided. The glass epoxy circuit board 31 mounts thereon the electric elements such as capacitors, except the switching element of the power conversion circuit unit 16.

A surface on the side of the heat releasing section for power supply 15B (see FIG. 6) of this glass epoxy circuit board 31 is fixed to the end surface portion 15 so as to contact the heat releasing section for power supply 15B. As a fixing manner, as shown in FIG. 7, the glass epoxy circuit board 31 is fixed to the screw holes 27S provided at the board receiving portions 27 of the board-connector fixing protrusions 26 with fixing screws (not shown in the drawings), and also fixed to the screw holes 27S provided at the heat releasing section for power supply 15B (see FIG. 6) with fixing screws (not shown in the drawings).

Here, since the power supply circuit unit 17 is formed by the glass epoxy circuit board 31, the circuit units could be mounted on both sides of the glass epoxy circuit board 31. On the surface of the glass epoxy circuit board 31 on the side of the heat releasing section for power supply 15B, the GMR element (not shown) or a rotation phase and rotation speed detection unit that is configured by a detection circuit formed by the GMR element is mounted, and detects the rotation phase and the rotation speed of the rotation shaft 23 (see FIG. 5) in cooperation with the rotation detection portion 24 (see FIG. 5) provided at the rotation shaft 23.

As described above, since the glass epoxy circuit board 31 is fixed to the end surface portion 15 so as to contact the heat releasing section for power supply 15B, it is possible to efficiently transmit heat generated at the power supply circuit unit 17 to the heat releasing section for power supply 15B. Heat transmitted to the heat releasing section for power supply 15B is further transmitted to and diffuses through the side peripheral surface portion 11A of the motor housing 11, and then is released to the outside. Here, by interposing one of a good heat transfer adhesive, a heat transfer grease and a heat transfer sheet between the glass epoxy circuit board 31 and the heat releasing section for power supply 15B, a heat transfer performance can be further improved.

As described above, the power supply circuit unit 17 is mounted on the heat releasing section for power supply 15B. The surface of the glass epoxy circuit board 31 on the side of the heat releasing section for power supply 15B, on which the circuit elements of the power supply circuit unit 17 are mounted, is fixed to the end surface portion 15 so as to contact the heat releasing section for power supply 15B. It is therefore possible to efficiently transmit heat generated at the power supply circuit unit 17 to the heat releasing section for power supply 15B. Heat transmitted to the heat releasing section for power supply 15B is further transmitted to and diffuses through the side peripheral surface portion 11A of the motor housing 11, and then is released to the outside.

Figure 8:
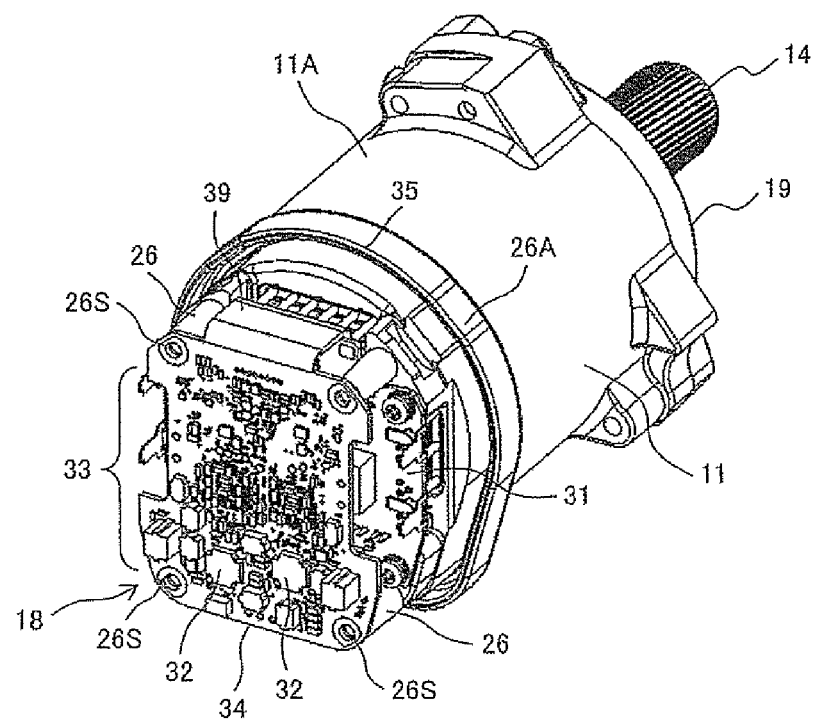
FIG. 8 is a perspective view showing a condition in which a control circuit unit is mounted on and fixed to the motor housing shown in FIG. 7.

Next, FIG. 8 shows a state in which the control circuit unit 18 is mounted above the power supply circuit unit 17. As shown in FIG. 8, the control circuit unit 18 is mounted above the power supply circuit unit 17. Microcomputers 32 and peripheral circuits 33 which form the control circuit unit 18 are mounted on the glass epoxy circuit board 34. The control circuit unit 18 also has the redundant system, and, as can be seen from the drawings, control circuits configured by the microcomputers 32 and the peripheral circuits 33, which are arranged symmetrically with respect to each other, are provided. The microcomputers 32 and the peripheral circuits 33 could be mounted on a surface of the glass epoxy circuit board 34 on the side of the power supply circuit unit 17 (see FIG. 7).

This glass epoxy circuit board 34 is fixed to the screw holes 26S provided at tops of the board-connector fixing protrusions 26 (see FIG. 7) with fixing screws (not shown in the drawings) so as to be sandwiched by the resin-made connector assembly 13, as shown in FIG. 8, and then a space in which the capacitors 29 and the coils 30 etc. of the power supply circuit unit 17 shown in FIG. 7 are arranged is provided between the glass epoxy circuit board 31 of the power supply circuit unit 17 and the glass epoxy circuit board 34 of the control circuit unit 18.

Next, FIG. 9 shows a state in which the resin-made connector assembly 13 is mounted above the control circuit unit 18. As shown in FIG. 9, the resin-made connector assembly 13 is mounted above the control circuit unit 18. The resin-made connector assembly 13 is fixed to the screw holes provided at the tops of board-connector fixing protrusions 26 with fixing screws 36 so as to sandwich the control circuit unit 18 between the power supply circuit unit 17 and the resin-made connector assembly 13.

In this state, as shown in FIG. 3, the resin-made connector assembly 13 is connected to the power conversion circuit unit 16, the power supply circuit unit 17, and the control circuit unit 18. Then, the metal cover 12 is configured to be fixed to the end surface portion 15 of the motor housing 11 in a manner to cover the control circuit unit 18, the power supply circuit unit 17, and the power conversion circuit unit 16 from the side of the resin-made connector assembly 13.

As mentioned above, in this type of electronic control device, there is a demand for a configuration in which, without clamping an element-side connection terminal extending from the power module and a counterpart-side connection terminal by a clamping jig, etc., tip end portions of both connection terminals can be closely contacted and joined. To correspond to such task, the following configuration is proposed in the present embodiment.

That is, the present embodiment has a configuration that an element-side connection terminal extending from a power conversion circuit unit comprises a first connection terminal portion that extends in a direction intersecting the direction of extension of a counterpart-side connection terminal, and a second connection terminal portion that is bent at a point before the first connection terminal portion reaches the counterpart-side connection terminal in a direction to obliquely intersect the direction of extension of the counterpart-side connection terminal such that the second connection terminal portion is provided with elasticity and is in an elastic contact with the counterpart-side connection terminal at a predetermined angle, and that a tip end side of the counterpart-side connection terminal and a tip end side of the second connection terminal portion are electrically joined.

According to this, the element-side connection terminal extending from the power conversion circuit unit is equipped with the second connection terminal portion that is brought into an elastic contact with the counterpart-side connection terminal at a predetermined angle. Therefore, it is possible to join the tip end side of the counterpart-side connection terminal and the tip end side of the second connection terminal portion without using a clamping jig, etc.

Figure 10:
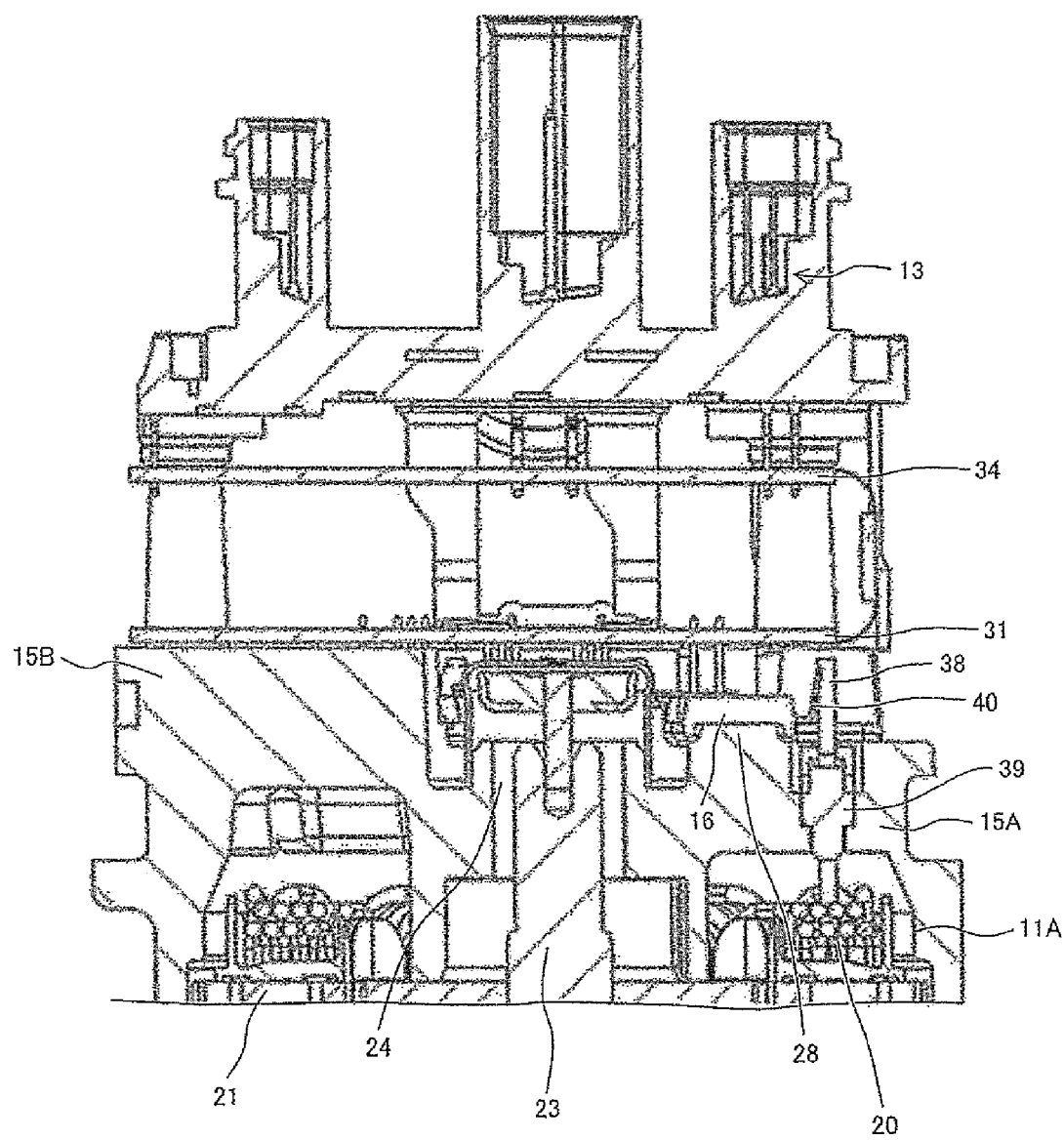
FIG. 10 is a main part sectional view in which the vicinity of an electronic control unit of the electric power steering device according to the embodiment of the present invention is sectioned in the axial direction.

Next, a specific configuration of the present embodiment is explained. Firstly, FIG. 10 shows a configuration in the vicinity where a motor-side connection terminal (counterpart-side connection terminal) of a motor winding wire of an electric motor and an element-side connection terminal of the power conversion circuit unit 16, which are connected by the present embodiment, are located.

A motor-side connection terminal 38 that serves as an input of a motor winding wire wound around the stator 21 of the electric motor is inserted into a synthetic-resin-made winding wire guide 39 and drawn from the end surface portion 15 to the side of the power conversion circuit unit 16. The winding wire guide 39 is disposed in an accommodation hole formed in the end surface portion 15. With this, the motor-side connection terminal 38 is positioned and fixed.

The power conversion circuit unit 16 is equipped with a plurality of power switching elements, and these are made of a synthetic resin by mold shaping. Therefore, an element-side connection terminal 40 is drawn from the power conversion circuit unit 16 surrounded by a synthetic resin. A tip end side of this element-side connection terminal 40 and a tip end side of the motor-side connection terminal 38 are electrically joined. Electric power controlled by the power conversion circuit unit 16 is supplied from the element-side connection terminal 40 to the motor-side connection terminal 38 to drive the electric motor. Here, in the present embodiment, a tip end side of the element-side connection terminal 40 and a tip end side of the motor-side connection terminal 38 are electrically joined by TIG welding. A tip end side of the element-side connection terminal 40 and a tip end side of the motor-side connection terminal 38 can also be joined by solder.

Figure 11:
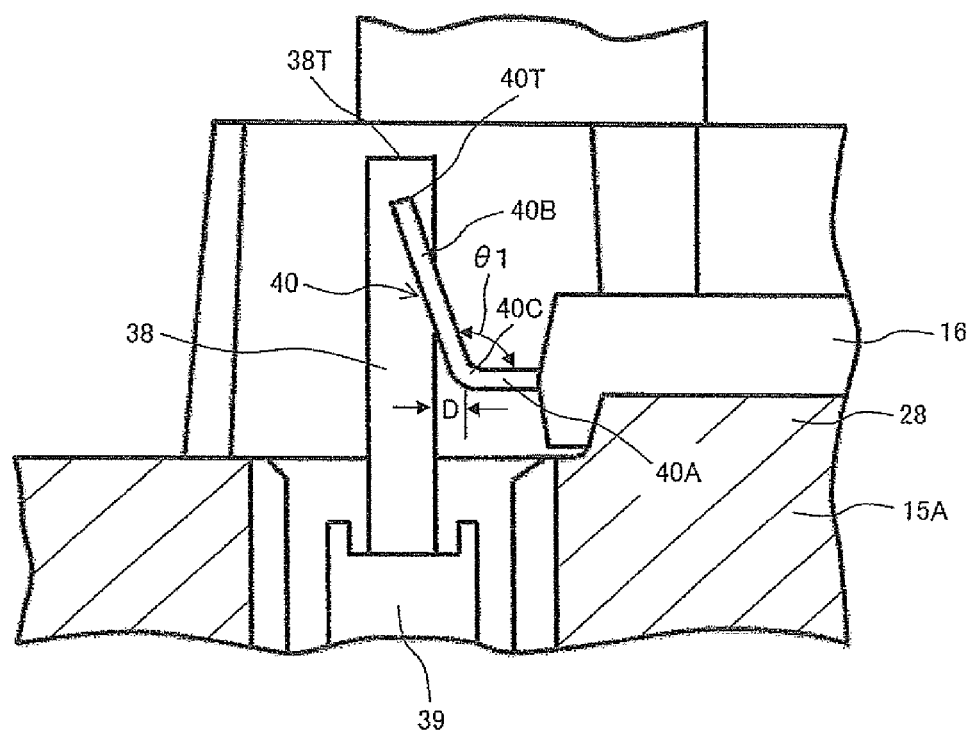
FIG. 11 is a sectional view showing a condition before joining a first-shape connection terminal of the power conversion circuit unit and a connection terminal of a motor winding wire of an electric motor.
Figure 12:
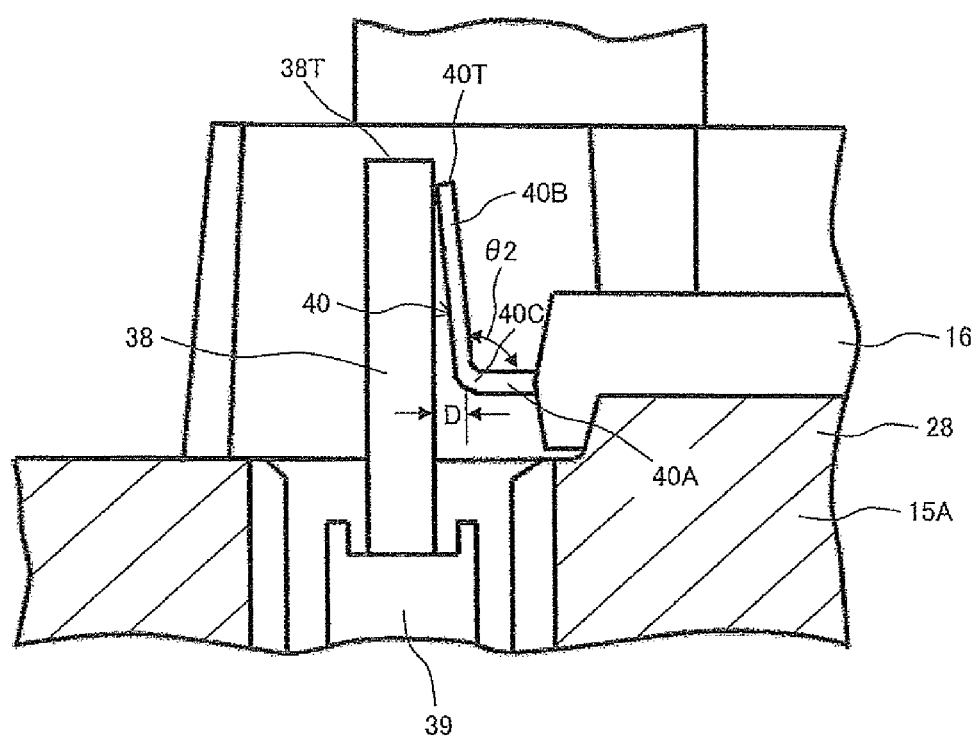
FIG. 12 is a sectional view showing a condition when conducting TIG welding between the first-shape connection terminal of the power conversion circuit unit and the connection terminal of the motor winding wire of the electric motor.

Next, with reference to FIGS. 11 and 12, a configuration of the motor-side connection terminal 38 of the motor winding wire of the electric motor and the element-side connection terminal 40 of the power switching element of the power conversion circuit unit 16 is explained. FIG. 11 shows a condition before joining a tip end side of the element-side connection terminal 40 and a tip end side of the motor-side connection terminal 38 by TIG welding. FIG. 12 shows a condition when joining the tip end side of the element-side connection terminal 40 and the tip end side of the motor-side connection terminal 38 by TIG welding.

In FIG. 11, the motor-side connection terminal 38 extends in a direction to be away from the end surface portion 15 of the motor housing 11 in the axial direction of the rotation shaft 23 (see FIG. 10). This extension refers to a condition in which the entirety or a part of the connection terminal extends in a predetermined direction. Furthermore, the cross-sectional shape orthogonal to the axis of the motor-side connection terminal 38 is formed into a circular shape, and it is formed of a motor winding wire itself.

On the other hand, the cross-sectional shape that is orthogonal to the axis of the element-side connection terminal 40 extending outward from the power conversion circuit unit 16 in which the power switching element is built is formed into a rectangular shape, and its condition with the motor-side connection terminal 38 formed of the motor winding wire turns into a line contact condition. The element-side connection terminal 40 is in the following shape in a condition that the element-side connection terminal 40 is not in contact with the motor-side connection terminal 38 before TIG welding.

That is, the element-side connection terminal 40 is configured by a first connection terminal portion 40A that extends in a direction to be orthogonal to the extension direction of the motor-side connection terminal 38, and a second connection terminal portion 40B that is bent at a point having a predetermined distance D before the first connection terminal portion 40A reaches the motor-side connection terminal 38 in a direction to obliquely intersect (intersect to have an oblique angle) the direction of extension (direction to be away from the end surface portion 15) of the motor-side connection terminal 38 to have a predetermined angle θ1 (angle between the first connection terminal portion 40A and the bent side of the second connection terminal portion 40B) such that the second connection terminal portion 40B is provided with elasticity.

Here, the predetermined distance D is set to a length that is longer than variation of set positions of the motor-side connection terminal 38 and the element-side connection terminal 40. With this, it is possible to prevent the motor-side connection terminal 38 and the element-side connection terminal 40 from interfering with each other. It is not necessary for the first connection terminal portion 40A to strictly orthogonally intersect the direction of extension of the motor-side connection terminal 38, but a variation of a certain extent can be allowed. Therefore, in the following, the notation of "intersect" may be used to include intersecting orthogonally, too.

Here, a bent portion 40C is formed between the first connection terminal portion 40A and the second connection terminal portion 40B. Via this bent portion 40C, the first connection terminal portion 40A and the second connection terminal portion 40B are continuously formed. Since the tip end side 40T of the second connection terminal portion 40B is in a free state, the bent portion 40C provides the second connection terminal portion 40B with elastic force.

Next, the element-side connection terminal 40 that extends outward from the power conversion circuit unit 16 in which the power switching element is built is in the following shape in a condition that the element-side connection terminal 40 is in contact with the motor-side connection terminal 38 when conducting TIG welding.

That is, the second connection terminal portion 40B of the element-side connection terminal 40 is displaced in a direction away from the motor-side connection terminal 38 with the bent portion 40C as the starting point, but the second connection terminal portion 40B is provided with elastic force by the bent portion 40C. Therefore, the tip end side 40T of the second connection terminal portion 40B is brought into contact with the motor-side connection terminal 38 by a predetermined elastic force to have a predetermined angle θ2 (angle between the first connection terminal portion 40A and the bent side of the second connection terminal portion 40B). Here, the predetermined angle has a relation of θ1>θ2. Furthermore, in this case, in the present embodiment, a space is formed on the side of the end surface portion 15 from a connection portion between the tip end side 40T of the second connection terminal 40B and the motor-side connection terminal 38.

In a condition immediately before TIG welding, the tip end side 40T of the second connection terminal portion 40B of the element-side connection terminal 40 turns into a condition of a constant contact with the tip end side 38T of the motor-side connection terminal 38 with a predetermined elastic force. In this condition, an electrode of a TIG welder is moved closer to the connection portion between the tip end side 40T of the second connection terminal portion 40B and the tip end side 38T of the motor-side connection terminal 38, and then TIG welding is conducted. With this, it is possible to join the tip end side 40T of the second connection terminal portion 40B and the tip end side 38T of the motor-side connection terminal 38.

In this way, the element-side connection terminal 40 extending from the power conversion circuit unit 16 is equipped with the second connection terminal portion that turns into an elastic contact with the motor-side connection terminal 38 by having a predetermined angle θ2. Therefore, it is possible to securely join the tip end side 40T of the second connection terminal portion 40B and the tip end side 38T of the motor-side connection terminal 38 without using a clamping jig, etc.

Furthermore, since such configuration is adopted, it is not necessary to so much consider variation of the setting positions of the element-side connection terminal 40 and the motor-side connection terminal 38. Therefore, it is also possible to omit the winding wire guides 39 that are used for securing the precision of the winding wires draw positions. This makes it possible to take effect in reducing the unit production cost.

Next, a modified embodiment of the element-side connection terminal is explained with reference to FIG. 13. The element-side connection terminal 40 shown in FIG. 12 is bent only one time, but the element-side connection terminal 41 shown FIG. 13 is different in terms of bending again toward the motor-side connection terminal 38 at a point before approaching the tip-end side.

Figure 13:
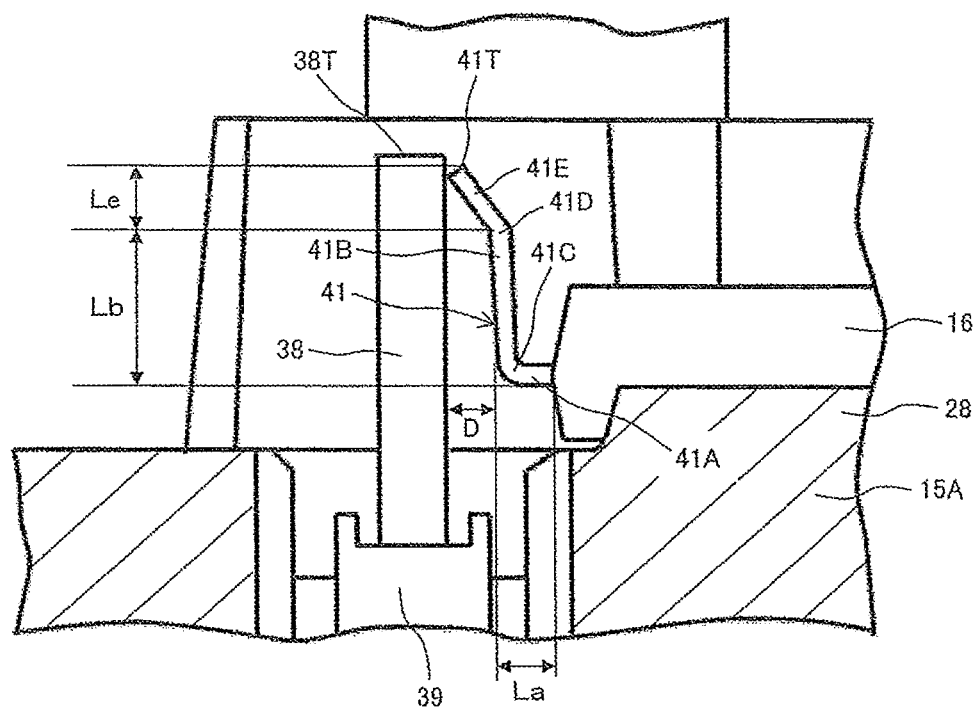
FIG. 13 is a sectional view showing a condition when conducting TIG welding between a second-shape connection terminal of the power conversion circuit unit and the connection terminal of the motor winding wire of the electric motor.
Figure 14:
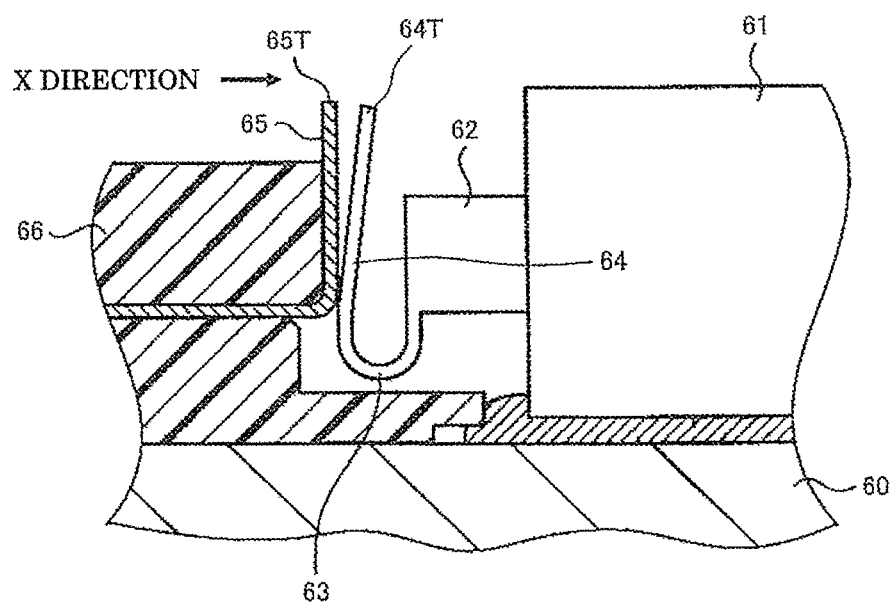
FIG. 14 is a sectional view showing a condition after connecting a connection terminal of a conventional power module and a connection terminal of a motor winding wire of an electric motor.

In FIG. 13, the motor-side connection terminal 38 extends in a direction to be away from the end surface portion 15 of the motor housing 11. On the other hand, the element-side connection terminal 41 is configured by a first connection terminal portion 41A that extends in a direction to be orthogonal to the extension direction of the motor-side connection terminal 38, and a second connection terminal portion 41B that is bent at a point having a predetermined distance D before the first connection terminal portion 41A reaches the motor-side connection terminal 38 in a direction to obliquely intersect the direction of extension (direction to be away from the end surface portion 15) of the motor-side connection terminal 38 to have a predetermined angle such that the second connection terminal portion 41B is provided with elasticity.

Here, a first bent portion 41C is formed between the first connection terminal portion 41A and the second connection terminal portion 41B. Via this first bent portion 41C, the first connection terminal portion 41A and the second connection terminal portion 41B are continuously formed. This is similar to the configuration of FIG. 12. On the other hand, in the modified embodiment, furthermore, the second connection terminal portion 41B is formed, before reaching the tip end side 41T, with a third connection terminal portion 41E that is bent by having a predetermined angle toward the extension direction of the motor-side connection terminal 38 by a second bent portion 41D.

Therefore, the second connection terminal portion 41B and the third connection terminal portion 41E are in a free state, the first bent portion 41C and the second bent portion 41D provide the second connection terminal portion 41B and the third connection terminal portion 41E with elastic force. With this, the tip end side 41T of the third connection terminal portion 41E turns into contact with the motor-side connection terminal 38 by a predetermined elastic force to have a predetermined angle. Even in this modified embodiment, a space is formed on the side of the end surface portion 15 from a connection portion between the tip end side 41T of the third connection terminal 41E and the motor-side connection terminal 38.

In this condition, an electrode of a TIG welder is moved closer to the connection portion between the tip end side 41T of the third connection terminal portion 41E and the tip end side 38T of the motor-side connection terminal 38, and then TIG welding is conducted. With this, it is possible to securely join the tip end side 41T of the third connection terminal portion 41E and the tip end side 38T of the motor-side connection terminal 38.

In this way, the element-side connection terminal 41 extending from the power conversion circuit unit 16 is equipped with the second connection terminal portion 41B and the third connection terminal portion 41E that turn into an elastic contact with the motor-side connection terminal 38 by having a predetermined angle(s). Therefore, it is possible to securely join the tip end side 41T of the third connection terminal portion 41E and the tip end side 38T of the motor-side connection terminal 38 without using a clamping jig, etc.

Furthermore, the element-side connection terminal 41 drawn from the power conversion circuit unit 16 is bent two times (more than two times is also acceptable) until it turns into contact with the motor-side connection terminal 38. With this, it is possible to decrease the effect of a load (stress) that enters into the power conversion circuit unit 16 from the element-side connection terminal 41.

Next, setting of the length of the element-side connection terminal 41 prior to TIG wielding is explained. In FIG. 13, when the length of the first connection terminal portion 41A is La, and when the length of the second connection terminal portion 41B is Lb and when the length of the third connection terminal portion 41E is Le, viewing in the extension direction of the motor-side connection terminal 38, these have a relation of "Lb>Le>La". In particular, since the length Lb of the second connection terminal portion 41B is made long, it becomes possible to buffer a load generated when a load from the third connection terminal portion 41E acts on the first connection terminal portion 41A.

As mentioned above, the present invention is configured such that an element-side connection terminal extending from a power module comprises a first connection terminal portion that extends in a direction intersecting the direction of extension of a counterpart-side connection terminal, and a second connection terminal portion that is bent at a point before the first connection terminal portion reaches the counterpart-side connection terminal in a direction to obliquely intersect the direction of extension of the counterpart-side connection terminal such that the second connection terminal portion is provided with elasticity and is in an elastic contact with the counterpart-side connection terminal at an angle, and that a tip end side of the counterpart-side connection terminal and a tip end side of the second connection terminal portion are electrically joined.

According to this, the element-side connection terminal extending from the power module is equipped with the second connection terminal portion that is brought into an elastic contact with the counterpart-side connection terminal at an angle. Therefore, it is possible to join the tip end side of the counterpart-side connection terminal and the tip end side of the second connection terminal portion without using a clamping jig, etc.

The present invention is not limited to the above-mentioned embodiments, but includes various modified embodiments. For example, the above-mentioned embodiments are those explained in detail for explaining the present invention to be easy to understand, and they are not necessarily limited to those equipped with all the components explained. Furthermore, it is possible to replace a part(s) of the structure of one embodiment with that of another embodiment. Furthermore, to the structure of one embodiment, it is also possible to add the structure of another embodiment. Furthermore, with respect to a part of the structure of each embodiment, it is possible to conduct addition, deletion and replacement of other structures.

The electronic control device based on the above-explained embodiments is considered to include, for example, the following aspects.

That is, according to one aspect, in an electronic control device equipped with a power module mounted on a circuit board, an element-side connection terminal extending from the power module, and a counterpart-side connection terminal that is electrically connected with the element-side connection terminal, the element-side connection terminal extending from the power module comprises a first connection terminal portion that extends in a direction intersecting a direction of extension of the counterpart-side connection terminal; and a second connection terminal portion that is bent at a point before the first connection terminal portion reaches the counterpart-side connection terminal in a direction to obliquely intersect the direction of extension of the counterpart-side connection terminal such that the second connection terminal portion is provided with elasticity and is in an elastic contact with the counterpart-side connection terminal at a predetermined angle, and a tip end side of the counterpart-side connection terminal and a tip end side of the second connection terminal portion are electrically joined.

In a preferable aspect of the electronic control device, the second connection terminal portion comprises a third connection terminal portion that is bent toward the counterpart-side connection terminal before reaching the tip end side of the second connection terminal portion such that the third connection terminal portion is in an elastic contact with the counterpart-side connection terminal at a predetermined angle, and the tip end side of the counterpart-side connection terminal and a tip end side of the third connection terminal portion are electrically joined.

In another preferable aspect according to any aspect of the electronic control device, a space is formed between the counterpart-side connection terminal and the second connection terminal portion.

In still another preferable aspect according to any aspect of the electronic control device, when length of the first connection terminal portion is La, and when length of the second connection terminal portion is Lb and when length of the third connection terminal portion is Le, viewing in the extension direction of the counterpart-side connection terminal, these have a relation of "Lb>Le>La".

In still another preferable aspect according to any aspect of the electronic control device, the tip end side of the counterpart-side connection terminal and a tip end side of the element-side connection terminal are subjected to TIG welding.

Furthermore, the electric drive device based on the above-mentioned embodiments is considered to include, for example, the following aspects.

That is, the electric drive device according to one aspect is an electric drive device equipped with an electric motor that drives a mechanical control element, a motor housing that receives the electric motor, and an electronic control unit for driving the electric motor, the electronic control unit being disposed on a side of an end surface portion of the motor housing, which is an opposite side to an output portion of a rotation shaft of the electric motor. The electronic control unit comprises a power supply circuit unit that generates a power supply as a main function, a power conversion circuit unit that drives the electric motor as a main function, and a control circuit unit that controls the power conversion circuit unit as a main function. An electric power is supplied from an element-side connection terminal of the power conversion circuit unit to a motor-side connection terminal of the electric motor. The element-side connection terminal extending from the power supply circuit unit comprises a first connection terminal portion that extends in a direction intersecting an extension direction of the motor-side connection terminal connected to a winding wire of the electric motor; and a second connection terminal portion that is bent at a point before the first connection terminal portion reaches the motor-side connection terminal in a direction to obliquely intersect the extension direction of the motor-side connection terminal such that the second connection terminal portion is provided with elasticity and is in an elastic contact with the motor-side connection terminal at a predetermined angle. A tip end side of the motor-side connection terminal and a tip end side of the second connection terminal portion are electrically joined.

In a preferable aspect of the electric drive device, the second connection terminal portion comprises a third connection terminal portion that is bent toward the motor-side connection terminal before reaching the tip end side of the second connection terminal portion such that the third connection terminal portion is in an elastic contact with the motor-side connection terminal at a predetermined angle, and the tip end side of the motor-side connection terminal and a tip end side of the third connection terminal portion are electrically joined.

In another preferable aspect according to any aspect of the electric drive device, a space is formed between the motor-side connection terminal and the second connection terminal portion.

In still another preferable aspect according to any aspect of the electric drive device, when length of the first connection terminal portion is La, and when length of the second connection terminal portion is Lb and when length of the third connection terminal portion is Le, viewing in the extension direction of the motor-side connection terminal, these have a relation of "Lb>Le>La".

In yet another preferable aspect according to any aspect of the electric drive device, the tip end side of the motor-side connection terminal and a tip end side of the element-side connection terminal are subjected to TIG welding.

The invention claimed is:

1. An electronic control device equipped with a power module mounted on a circuit board, an element-side connection terminal extending from the power module, and a counterpart-side connection terminal that is electrically connected with the element-side connection terminal,
the element-side connection terminal extending from the power module, comprising:
a first connection terminal portion that extends from the power module in a direction intersecting a direction of extension of the counterpart-side connection terminal; and
a second connection terminal portion that is bent at a point before the first connection terminal portion reaches the counterpart-side connection terminal in a direction to obliquely intersect the direction of extension of the counterpart-side connection terminal such that the second connection terminal portion is provided with elasticity and is in an elastic contact with the counterpart-side connection terminal at a predetermined angle,
wherein the second connection terminal portion is longer than the first connection terminal portion,
wherein a tip end side of the counterpart-side connection terminal and a tip end side of the second connection terminal portion are electrically joined.

2. The electronic control device as claimed in claim 1, wherein a space is formed between the counterpart-side connection terminal and the second connection terminal portion.

3. The electronic control device as claimed in claim 1, wherein the tip end side of the counterpart-side connection terminal and a tip end side of the element-side connection terminal are subjected to TIG welding.

4. An electronic control device equipped with a power module mounted on a circuit board, an element-side connection terminal extending from the power module, and a counterpart-side connection terminal that is electrically connected with the element-side connection terminal,
the element-side connection terminal extending from the power module, comprising:
a first connection terminal portion that extends in a direction intersecting a direction of extension of the counterpart-side connection terminal; and
a second connection terminal portion that is bent at a point before the first connection terminal portion reaches the counterpart-side connection terminal in a direction to obliquely intersect the direction of extension of the counterpart-side connection terminal such that the second connection terminal portion is provided with elasticity and is in an elastic contact with the counterpart-side connection terminal at a predetermined angle,
wherein a tip end side of the counterpart-side connection terminal and a tip end side of the second connection terminal portion are electrically joined,
wherein the second connection terminal portion comprises a third connection terminal portion that is bent toward the counterpart-side connection terminal before reaching the tip end side of the second connection terminal portion such that the third connection terminal portion is in an elastic contact with the counterpart-side connection terminal at a predetermined angle, and
wherein the tip end side of the counterpart-side connection terminal and a tip end side of the third connection terminal portion are electrically joined.

5. The electronic control device as claimed in claim 4, wherein, when length of the first connection terminal portion is La, and when length of the second connection terminal portion is Lb and when length of the third connection terminal portion is Le, viewing in the extension direction of the counterpart-side connection terminal, these have a relation of "Lb>Le>La".

6. An electric drive device equipped with an electric motor that drives a mechanical control element, a motor housing that receives the electric motor, and an electronic control unit for driving the electric motor, the electronic control unit being disposed on a side of an end surface portion of the motor housing, which is an opposite side to an output portion of a rotation shaft of the electric motor,
the electronic control unit comprising a power supply circuit unit that generates a power supply as a main function, a power conversion circuit unit that drives the electric motor as a main function, and a control circuit unit that controls the power conversion circuit unit as a main function, an electric power being supplied from an element-side connection terminal of the power conversion circuit unit to a motor-side connection terminal of the electric motor,
the element-side connection terminal extending from the power supply circuit unit, comprising:
a first connection terminal portion that extends from the power supply circuit unit in a direction intersecting an extension direction of the motor-side connection terminal connected to a winding wire of the electric motor; and
a second connection terminal portion that is bent at a point before the first connection terminal portion reaches the motor-side connection terminal in a direction to obliquely intersect the extension direction of the motor-side connection terminal such that the second connection terminal portion is provided with elasticity and is in an elastic contact with the motor-side connection terminal at a predetermined angle,
wherein the second connection terminal portion is longer than the first connection terminal portion,
wherein a tip end side of the motor-side connection terminal and a tip end side of the second connection terminal portion are electrically joined.

7. The electric drive device as claimed in claim 6, wherein a space is formed between the motor-side connection terminal and the second connection terminal portion.

8. The electric drive device as claimed in claim 6, wherein the tip end side of the motor-side connection terminal and a tip end side of the element-side connection terminal are subjected to TIG welding.

9. An electric drive device equipped with an electric motor that drives a mechanical control element, a motor housing that receives the electric motor, and an electronic control unit for driving the electric motor, the electronic control unit being disposed on a side of an end surface portion of the motor housing, which is an opposite side to an output portion of a rotation shaft of the electric motor, the electronic control unit comprising a power supply circuit unit that generates a power supply as a main function, a power conversion circuit unit that drives the electric motor as a main function, and a control circuit unit that controls the power conversion circuit unit as a main function, an electric power being supplied from an element-side connection terminal of the power conversion circuit unit to a motor-side connection terminal of the electric motor, the element-side connection terminal extending from the power supply circuit unit, comprising:

a first connection terminal portion that extends in a direction intersecting an extension direction of the motor-side connection terminal connected to a winding wire of the electric motor; and a second connection terminal portion that is bent at a point before the first connection terminal portion reaches the motor-side connection terminal in a direction to obliquely intersect the extension direction of the motor-side connection terminal such that the second connection terminal portion is provided with elasticity and is in an elastic contact with the motor-side connection terminal at a predetermined angle, wherein a tip end side of the motor-side connection terminal and a tip end side of the second connection terminal portion are electrically joined, wherein the second connection terminal portion comprises a third connection terminal portion that is bent toward the motor-side connection terminal before reaching the tip end side of the second connection terminal portion such that the third connection terminal portion is in an elastic contact with the motor-side connection terminal at a predetermined angle, and wherein the tip end side of the motor-side connection terminal and a tip end side of the third connection terminal portion are electrically joined.

10. The electric drive device as claimed in claim 9, wherein, when length of the first connection terminal portion is La, and when length of the second connection terminal portion is Lb and when length of the third connection terminal portion is Le, viewing in the extension direction of the motor-side connection terminal, these have a relation of "Lb>Le>La".

* * * * *